US006980236B1

(12) United States Patent
Kojima et al.

(10) Patent No.: US 6,980,236 B1
(45) Date of Patent: Dec. 27, 2005

(54) INFORMATION PROCESSING APPARATUS WITH IMAGE CAPTURING FUNCTION METHOD AND STORAGE MEDIUM THEREOF

(75) Inventors: Kiyonobu Kojima, Kanagawa (JP); Naoki Fujisawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/340,739

(22) Filed: Jun. 28, 1999

(30) Foreign Application Priority Data

Jun. 30, 1998 (JP) .......................................... 10-184354

(51) Int. Cl.[7] ........................ H04N 2/225; H04N 11/00; G09G 5/00

(52) U.S. Cl. .................. 348/207.99; 348/552; 345/169

(58) Field of Search ................................ 345/169–172, 345/700, 156, 168; 715/700–703, 821–832; 348/207, 522, 207.1, 207.11, 552

(56) References Cited

U.S. PATENT DOCUMENTS 5,475,441 A * 12/1995 Parulski et al. ............. 348/552
5,801,919 A * 9/1998 Griencewic ................. 361/683
5,898,600 A * 4/1999 Isashi ......................... 708/105
6,025,827 A * 2/2000 Bullock et al. ............. 715/810
6,141,052 A * 10/2000 Fukumitsu et al. ......... 348/373
6,184,930 B1 * 2/2001 Mitsuhashi et al. .... 348/333.01
6,417,869 B1 * 7/2002 Do ............................ 715/810
6,670,985 B2 * 12/2003 Karube et al. ........... 348/207.1
2002/0008763 A1 * 1/2002 Kawamura et al. .... 348/333.02
2004/0017474 A1 * 1/2004 Jenkins et al. ........... 348/207.1

* cited by examiner

*Primary Examiner*—Thai Tran
*Assistant Examiner*—Nhan Tran
(74) *Attorney, Agent, or Firm*—Frommer Lawrence & Haug LLP; William S. Frommer

(57) ABSTRACT

The invention relates to an apparatus and a method for information processing allowing a personal computer to pick up an image through operation of a single button. When a half-push switch is turned on, a CPU activates a window of an image pickup application program, causing the window to appear in front of the windows of all other application programs. An image displayed in the window of the image pickup application program is held still even if a personal computer is altered in its orientation. When a full-push switch is turned on, the image in the window of the image pickup application program is stored onto an HDD in a suitable format.

13 Claims, 11 Drawing Sheets

INFORMATION PROCESSING APPARATUS WITH IMAGE CAPTURING FUNCTION METHOD AND STORAGE MEDIUM THEREOF

BACKGROUND OF THE INVENTION

The present invention relates to an information processing apparatus, an information processing method and a storage medium. More particularly, the invention relates to an information processing apparatus, an information processing method, and a storage medium for retrievably accommodating the method, the apparatus and the method permitting images to be picked up.

In recent years, some personal computers have come to embrace multimedia and accommodate a CCD camera and its interface, the camera picking up images of a user or other objects. Images are picked up when an application program addressing such processing is carried out by the computer.

Meanwhile, drastic improvements in the processing performance of personal computers have made it possible for their operating system to provide as a standard feature a multitask environment in which to run a plurality of application programs such as a word processor application, a spreadsheet application and an image processing application.

At the same time, graphically-driven window systems have become a standard user interface. This has shifted the status of a principal manipulative device from the keyboard to the pointing device such as a mouse or a track ball.

In that operating environment, a user utilizing a CCD camera mounted on a personal computer to get a picture of an object must first operate a pointing device to activate an image pickup application program. The user then needs to perform further operations to pick up the image.

The problem is that it takes time to operate the pointing device moving the pointer position, pushing a button or manipulating other controls when and where appropriate. The time-consuming chore often causes the use to miss a perfect moment for a good picture.

SUMMARY OF THE INVENTION

It is therefore an object of the present invention to provide an apparatus and a method for information processing allowing manipulation of a single button to operate a personal computer to pick up an image.

Other objects, features and advantages of the invention will become more apparent upon a reading of the following description and appended drawings.

DESCRIPTION OF THE PREFERRED EMBODIMENTS

Figure 1:
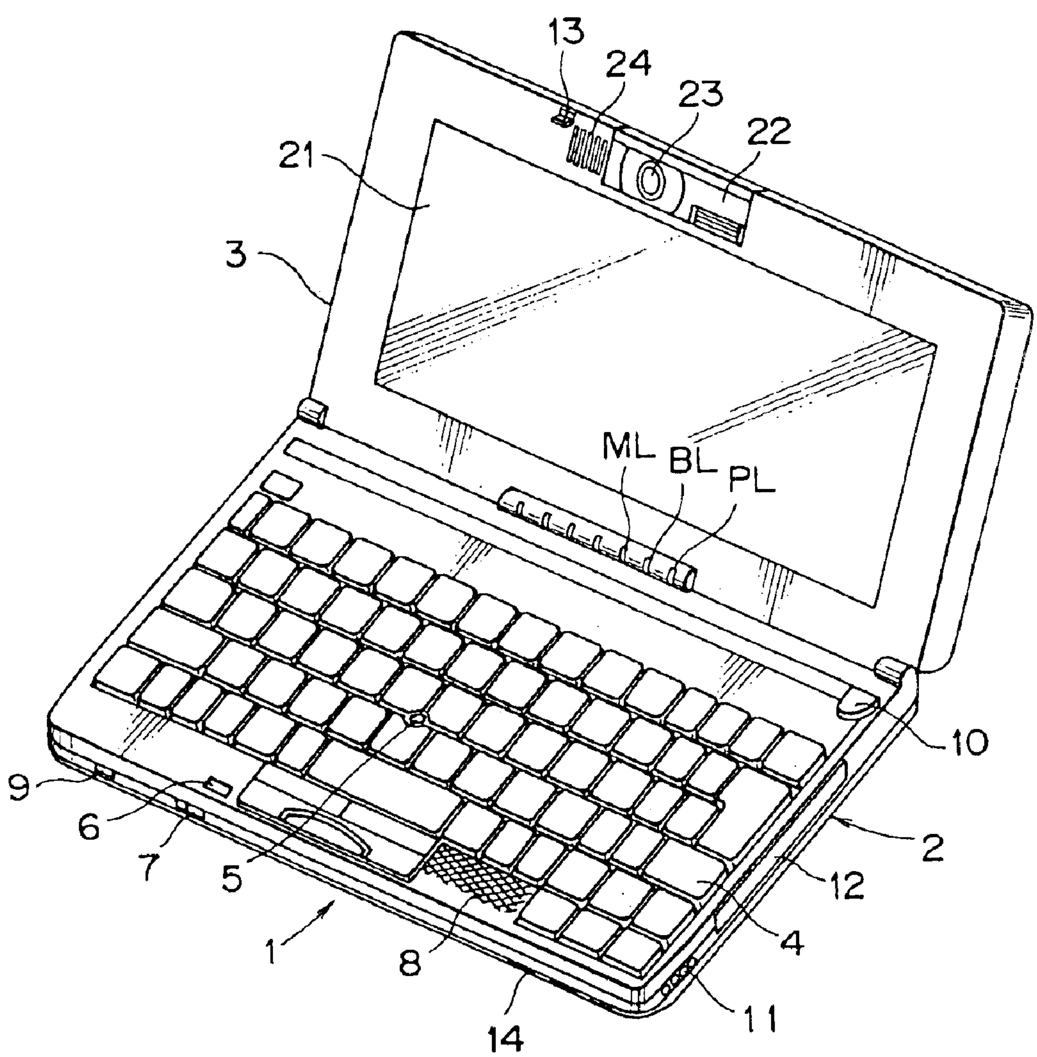
FIG. 1 is a schematic view showing a typical structure of a personal computer.
Figure 2:
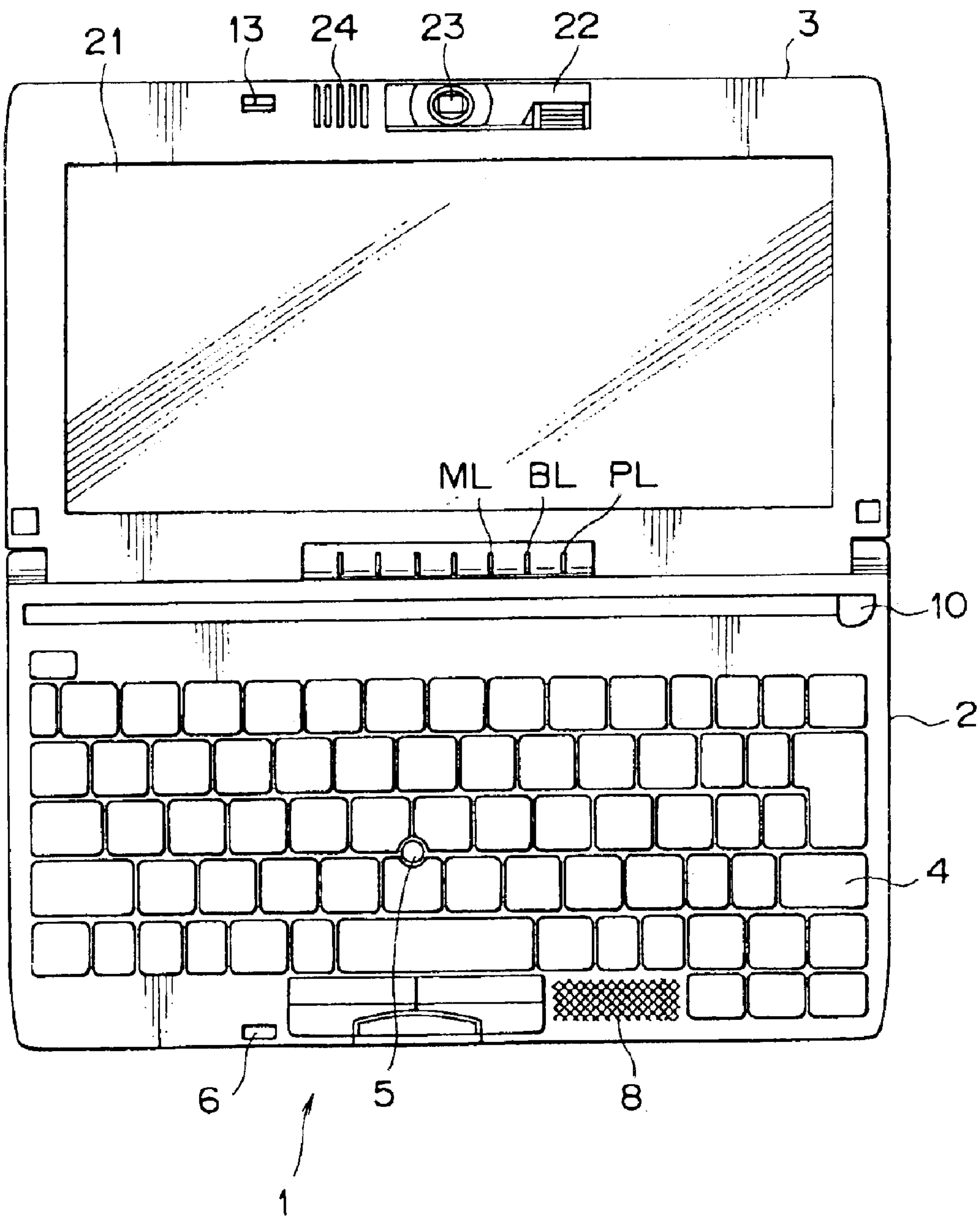
FIG. 2 is a top view of the personal computer.
Figure 3:
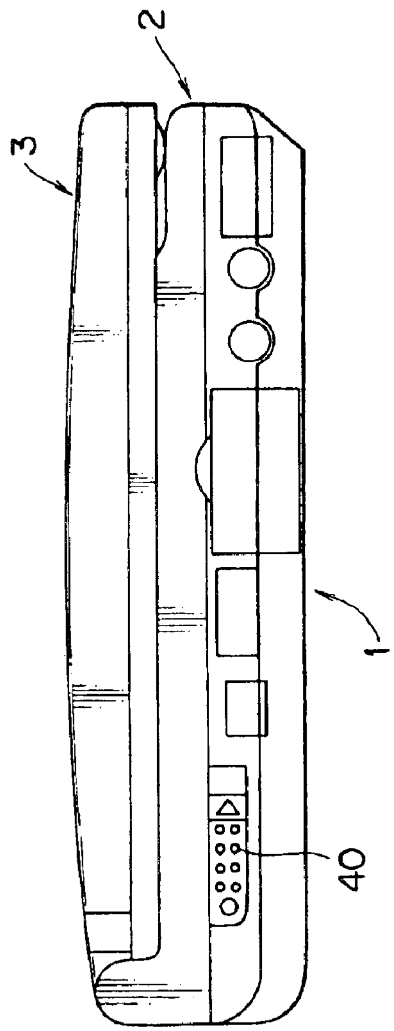
FIG. 3 is a side view of the personal computer.
Figure 4:
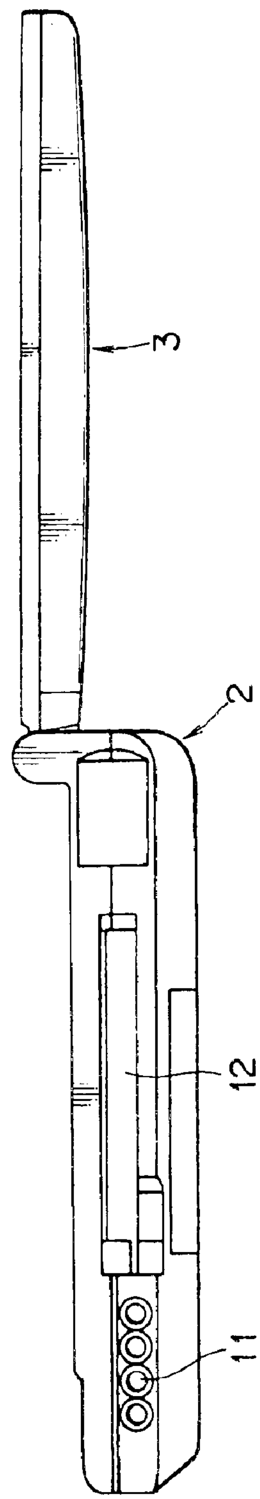
FIG. 4 is a side view of the personal computer with its display part swung open away from its body.
Figure 5:
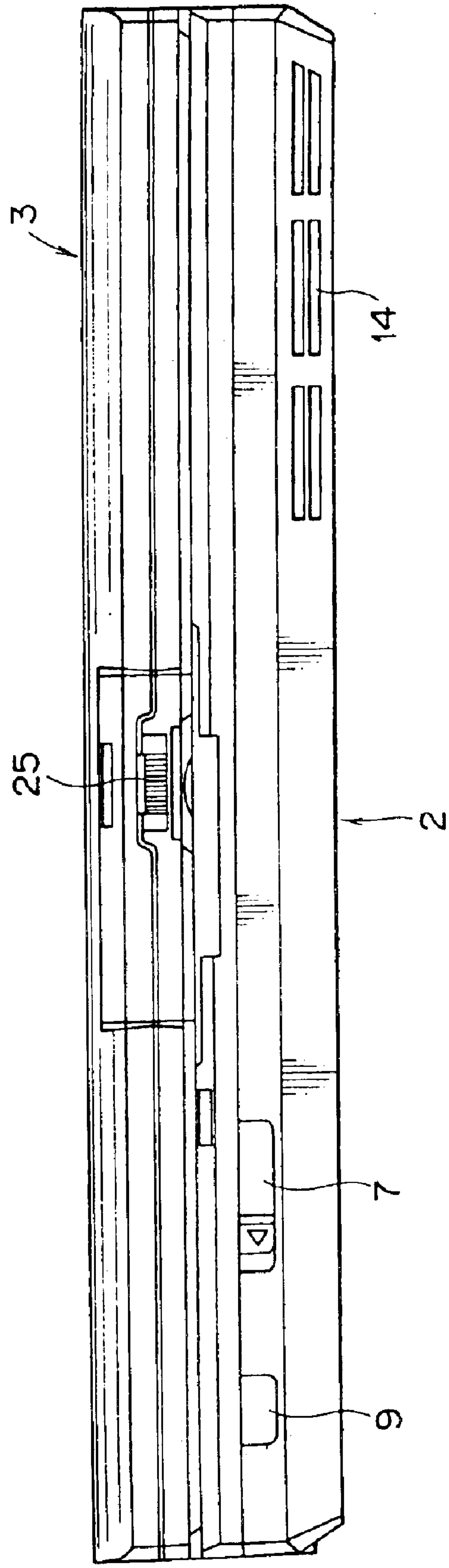
FIG. 5 is a front view of the personal computer.
Figure 6:
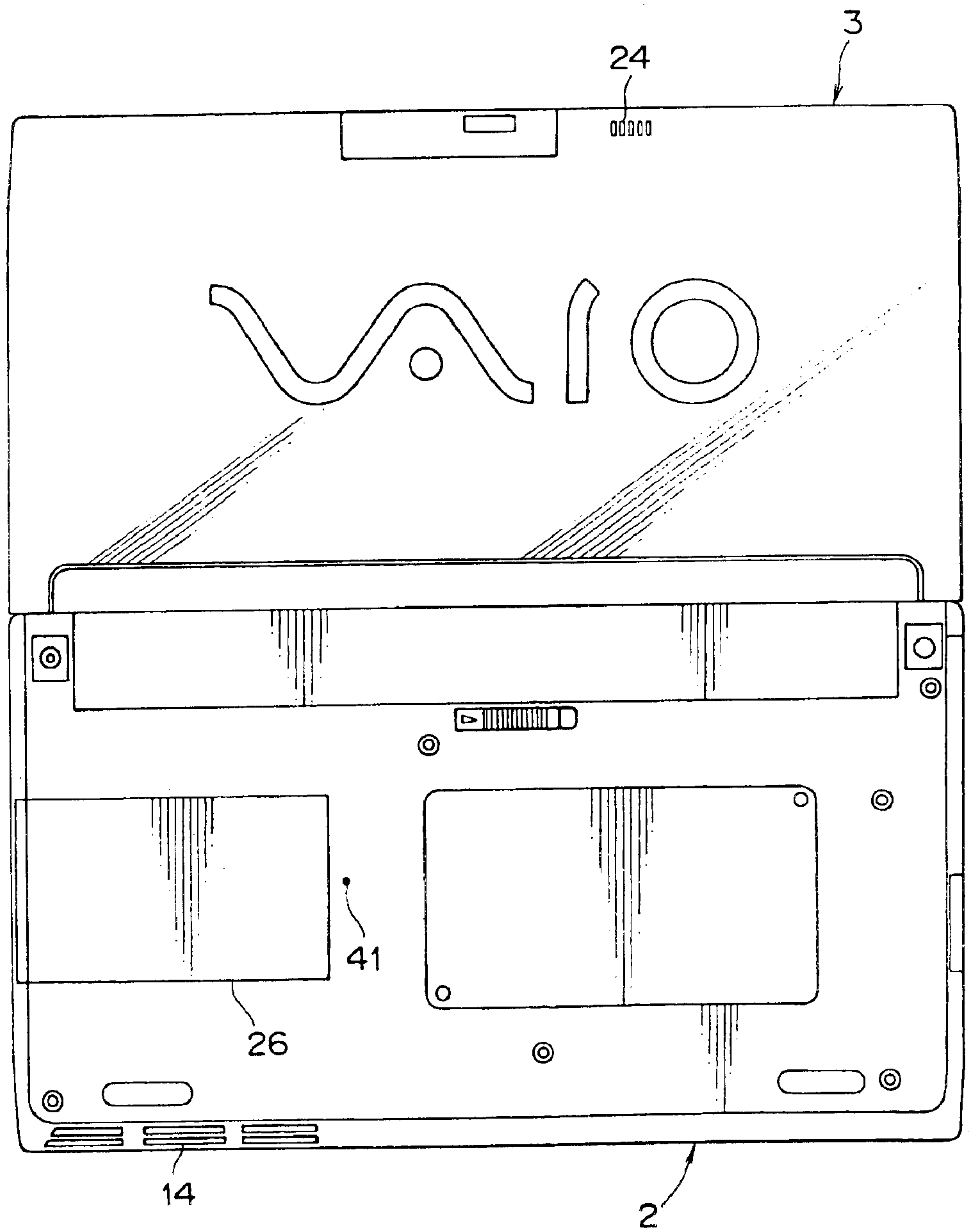
FIG. 6 is a bottom view of the personal computer.

FIGS. 1 through 6 show a typical structure of a portable personal computer 1 to which this invention is applied. The personal computer 1 is a mini-notebook type personal computer that primarily comprises a body 2 and a display part 3 attached swingingly to the body 2. FIG. 1 is a perspective view of the computer with the display part 3 swung open away from the body 2. FIG. 2 is a plan view of the computer in FIG. 1. FIG. 3 is a left-hand side view of the computer with the display part 3 swung shut onto the body 2. FIG. 4 is a right-hand side view of the computer with the display part 3 swung open 180 degrees relative to the body 2. FIG. 5 is a front view of the computer in FIG. 3. FIG. 6 is a bottom view of the computer in FIG. 4.

The face of the body 2 comprises a keyboard 4 and a track point (registered trademark) 5. The keyboard 4 is used to input characters, symbols, etc., and the track point 5 is operated to move a mouse cursor. Also furnished on the body face is a speaker 8 for sound output along with a shutter button 10 operated to take a picture using the CCD video camera 23 mounted on the display part 3.

A pawl 13 is provided at the upper end of the display part 3. As shown in FIG. 3, with the display part 3 swung closed onto the body 2, the pawl 13 hooks onto a hole 6 in the body 2. At the front of the body 2 is a slide lever 7 furnished in a crosswise movable fashion. The slide lever 7 is used to lock and unlock the pawl 13 so that the pawl 13 is engaged with and disengaged from the hole 6. With the pawl 13 unlocked, the display part 3 may be swung open away from the body 2. Adjacent to the pawl 13 is a microphone 24 which, as depicted in FIG. 6, may pick up sound from both the front and the back side of the body 2.

The front of the body 2 further comprises a programmable power key (PPK) 9. An air outlet 11 is provided on the right-hand side of the body 2, as shown in FIG. 4. At the lower end in front of the body 2 is an air inlet 14 as depicted in FIG. 5. To the right of the air outlet 11 is a slot 12 that accommodates a PCMCIA (Personal Computer Memory Card International Association) card (called a PC card).

An LCD (liquid crystal display) 21 for displaying images is provided on the front of the display part 3. At the upper end of the LCD 21 is an image pickup part 22 mounted rotatably on the display part 3. More specifically, the image pickup part 22 is rotatable to any position within a range of 180 degrees in the same direction as the LCD 21 and in the opposite direction thereof (i.e., toward the back). The image pickup part 22 is furnished with the CCD video camera 23.

At the lower end of the display part 3 on the body side is a group of lamps including a power lamp PL, a battery lamp BL, a message lamp ML and other LEDs. Reference numeral 40 in FIG. 3 denotes a power switch furnished on the left-side of the body 2, and reference numeral 25 in FIG. 5 represents an adjusting ring used to adjust the focus of the CCD video camera 23. Reference numeral 26 in FIG. 6 stands for a cover that conceals an opening through which to install an additional memory into the body 2, and reference numeral 41 denotes a hole through which to insert a pin to unlock the cover 26.

Figure 7:
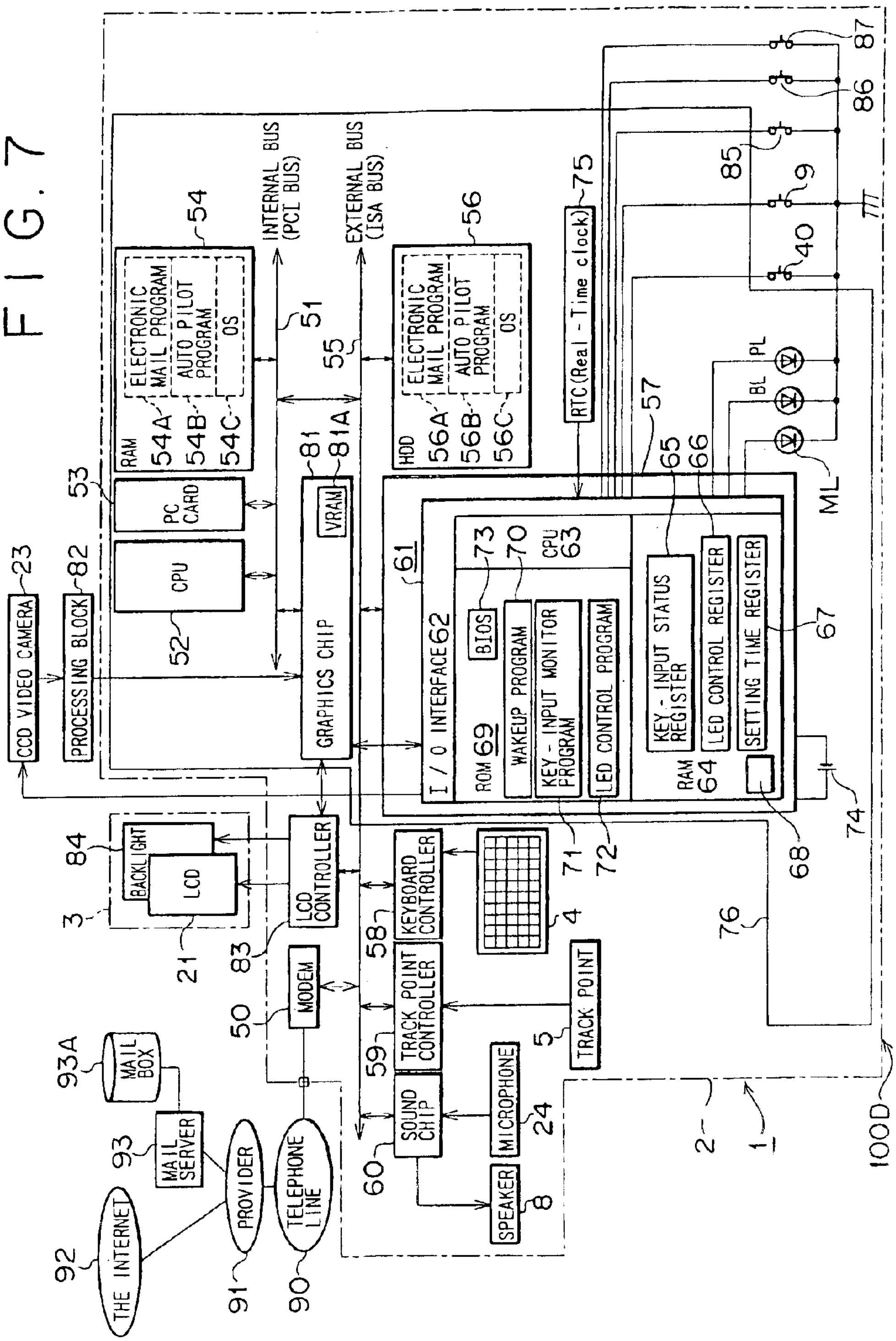
FIG. 7 is a function block diagram of the personal computer.

FIG. 7 illustrates an internal structure of the personal computer 1. As shown in FIG. 7, an internal bus 51 is connected to a CPU (central processing unit) 52, a PC card 53 inserted as needed, a RAM (random access memory) 54, and a graphic chip 81. The internal bus 51 is coupled to an external bus 55. The external bus 55, for its part, is connected to a hard disk drive (HDD) 56, an I/O (input/output) controller 57, a keyboard controller 58, a track point controller 59, a sound chip 60, an LCD controller 83, and a modem 50.

The CPU 52 is a controller that controls diverse computer functions. The PC card 53 is installed as needed when an optimal function is to be added.

When the personal computer 1 is booted up, an electronic mail program (an application program) 54A, an auto pilot program (another application program) 54B and the OS (operating program) 54C are transferred from the HDD 56 to the RAM 54 and retained therein.

The electronic mail program 54A is a program that exchanges communication messages with an external entity using a communication line such as a telephone line and by way of a network. A received mail acquisition function is specifically included in the electronic mail program 54A. The received mail acquisition function checks a mail server 93 to see if a mail box 93A therein contains any mail addressed to this program (i.e., to the user). If any such mail is found in the mail box 93A, the received mail acquisition function carries out a suitable process to acquire that mail.

The auto pilot program 54B is a program that starts up and carries out a plurality of predetermined processes (or programs) in a predetermined sequence.

The OS (operating system) 54C controls basic computer functions. A typical operating system is Windows 95 (registered trademark).

The hard disk drive (HDD) 56 connected to the external bus 55 contains the electronic mail program 56A, auto pilot program 56B, and OS (operating system) 56C. During the booting process, the OS 56C, auto pilot program 56B and electronic mail program 56A are transferred successively from the hard disk drive 56 to the RAM 54 and stored in the memory.

The I/O controller 57 has a microcontroller 61 equipped with an I/O interface 62. The microcontroller 61 is constituted by the I/O interface 62, a CPU 63, a RAM 64 and a ROM 69 which are interconnected. The RAM 64 includes a key input status register 65, an LED (light-emitting diode) control register 66, a set time register 67, and a register 68. The set time register 67 is used to start the operation of a start sequence controller 76 when a time present by the user (i.e., starting condition) is reached. The register 68 holds a correspondence between a preset combination of operation keys (starting condition) on the one hand and an application program to be started on the other hand. When the user inputs the preset combination of operation keys, the corresponding application program (e.g., electronic mail program) is started.

When the fingertips-operated programmable power key (PPK) 9 is pushed, the key input status register 65 gets and retains an operation key flag. The LED control register 66 is used to control the illumination of the message lamp ML indicating that boot-up status of an application program (e.g., electronic mail program) which is held in the register 68. A desired time of day may be set to the set time register 67.

The microcontroller 61 is connected to a backup battery 74. The battery 74 allows contents of the registers 65, 66 and 67 to be retained when power to the body 2 is turned off.

The ROM is the microcontroller 61 contains a advance a wake-up program 70, a key input monitoring program 71, and an LED control program 72. The ROM 69 is illustratively composed of an EEPROM (electrically erasable and programmable read only memory). The EEPROM is also called a flash memory. The microcontroller 61 is connected to an RTC (real-time clock) 75 that keeps the current time.

The wake-up program 70 in the ROM 69 is a program that checks to see if a preset time in the set time register 67 is reached on the basis of time-of-data from the RTC 75. When the preset time is reached, the wake-up program 70 starts up a predetermined process (or program). The key input monitoring program 71 continuously monitors whether the PPK 9 is pushed by the user. The LED control program 72 controls the lighting of the message lamp ML.

Furthermore, the ROM 69 contains a BIOS (basic input/output system) 73. The BIOS is a software program that controls exchanges of data (input and output between the OS or application software on the one hand and peripheral devices (e.g., display part, keyboard, hard disk drive) on the other hand.

The keyboard controller 58 connected to the external bus 55 controls input from the keyboard 4. The track point controller 59 controls input from the track point 5.

The sound chip 60 receives input from the microphone 24, and supplies sound signals to a built-in speaker 8.

The modem 50 permits connection to a communication network 92 such as the Internet and to the mail server 93 through a public telephone line 90 and an Internet service provider 91.

Image data captured by the CCD video camera 23 are forwarded to a processing part 82 for processing. The image data processed by the processing part 82 are input to the graphic chip 81 connected to the internal bus 51. The graphic chip 81 stores the input video data into an internal VRAM 81A, and retrieves the data from the memory as needed for output to the LCD controller 83. Given the image data from the graphic chip 81, the LCD controller 83 outputs the data to the LCD 21 for display. Back lights 84 are provided to illuminate the LCD 21 from the back.

The power switch 40 is operated to turn on and off the power supply. A half-push switch 85 is activated when the shutter button 10 is half-pushed. A full-push switch 86 is turned on when the shutter button 10 is fully pushed. A reverse switch 87 is turned on when the image pickup part 22 is rotated by 180 degrees (i.e., when the CCD video camera 23 is rotated into a direction suitable for picking up an image on the opposite side of the LCD 21).

Figure 8:
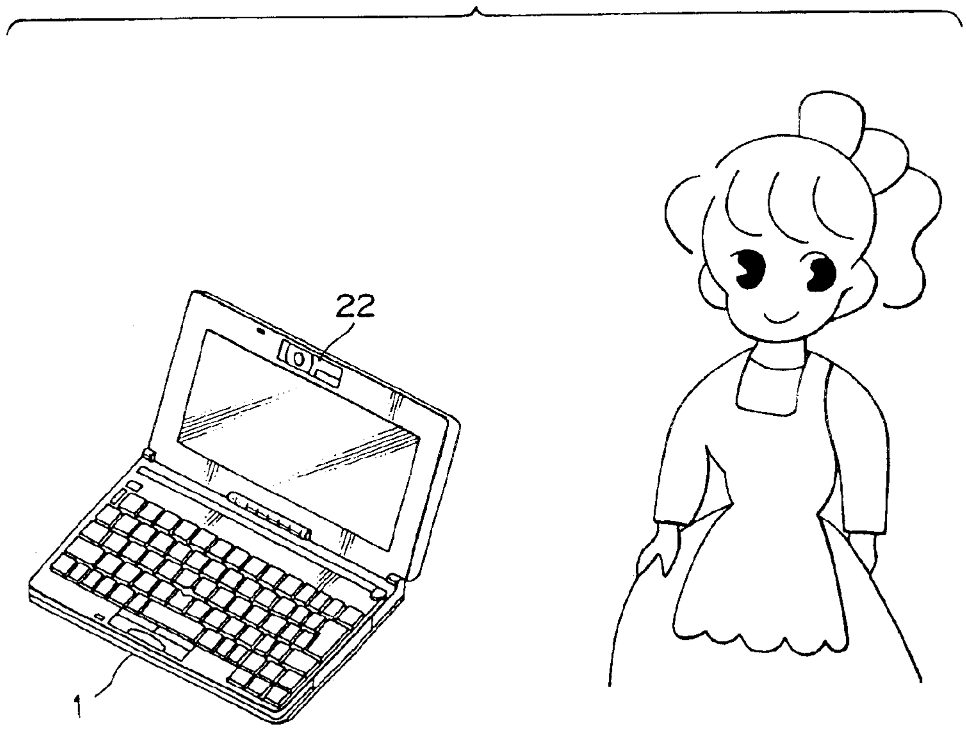
FIG. 8 is an explanatory view of a situation where an image of an object is picked up by the personal computer.

FIG. 8 illustrates a situation where the personal computer 1 is used to pick up an image of an object. The user of the personal computer 1 rotates the image pickup part 22 at the upper end of the display part 3 in the opposite direction of the LCD 21 so as to take a picture of the object in front of the user.

Figure 9:
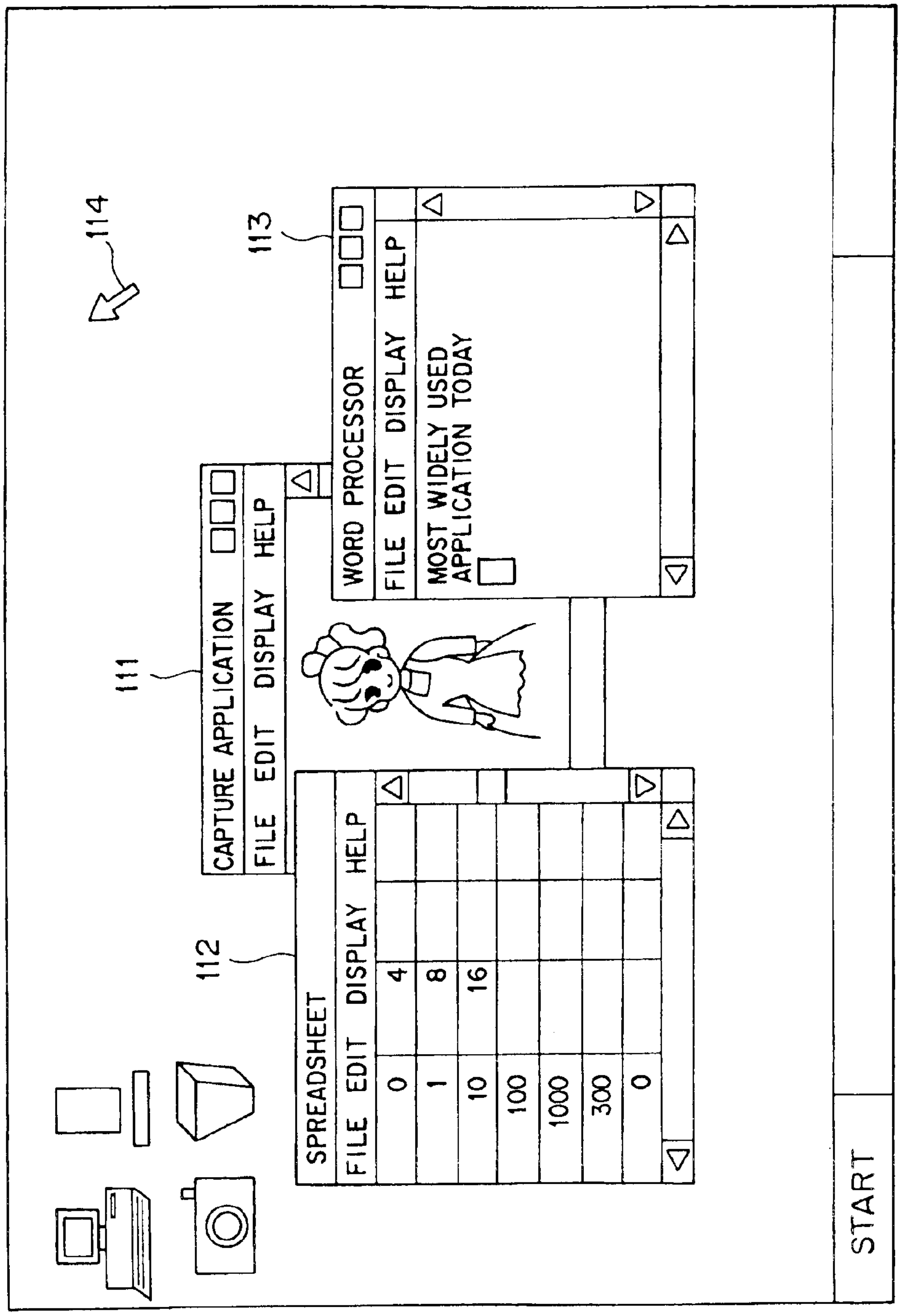
FIG. 9 is a schematic view of a display on an LCD in effect before a shutter button is pushed.

FIG. 9 shows a display on the LCD 21 in effect before the shutter button 10 is pushed. A window 111 of the image pickup application program appears behind a window 112 of a spreadsheet application program and a window 113 of a word processor application program.

Figure 10:
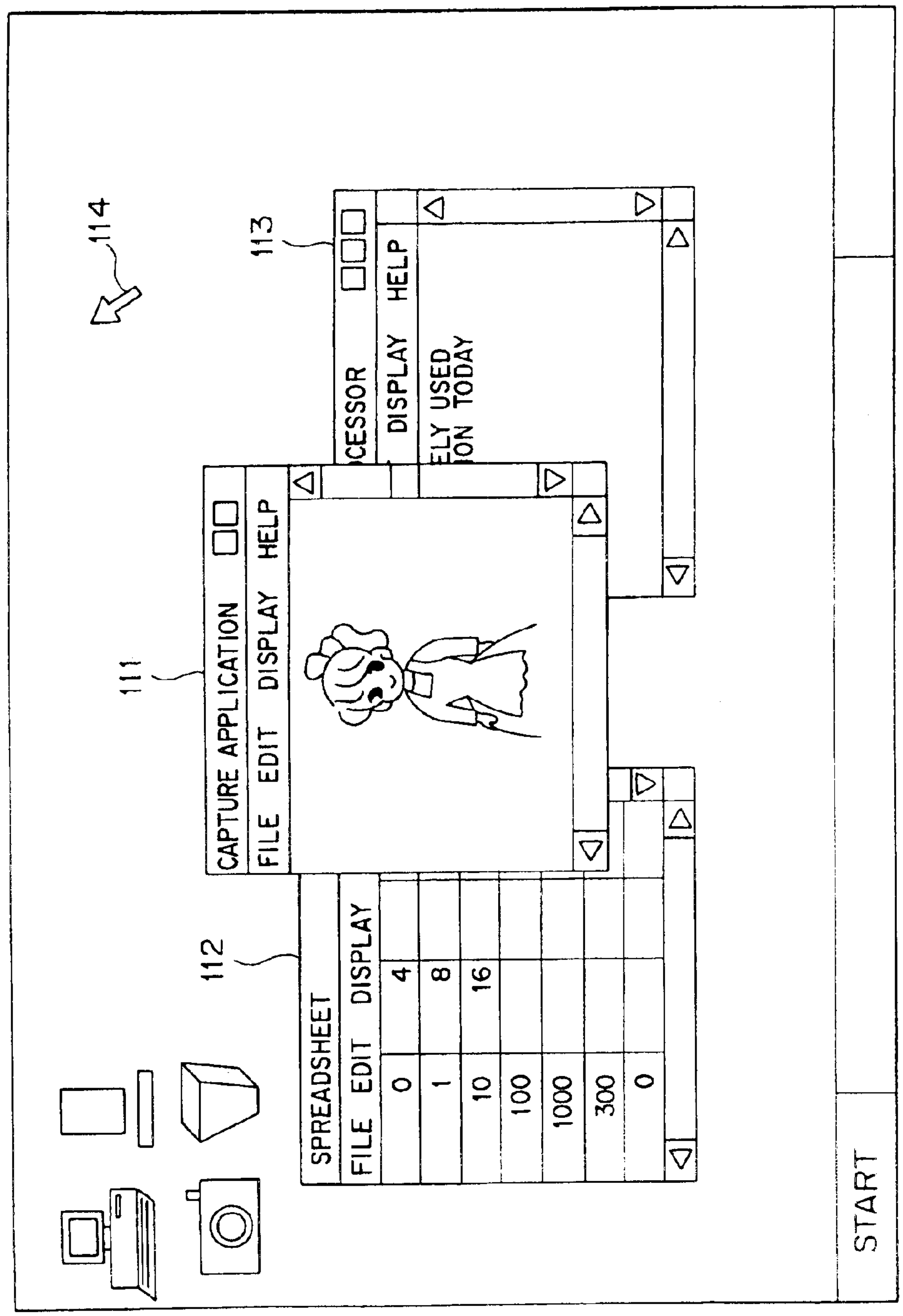
FIG. 10 is a schematic view of a display on the LCD in effect when the shutter button is half-pushed.

FIG. 10 depicts a display on the LCD 21 in effect when the shutter button 10 is half-pushed. Half-pushing the shutter button 10 activates the window 111 of the image pickup application program without clicking on the window 111 using a pointer 114. The window 111 now appears in the foreground in front of the window 112 of the spreadsheet application program and the window 113 of the word processor application program. An image displayed in the window 111 of the image pickup application program is held still even if the personal computer 1 is altered in its orientation. In this state, fully pushing the shutter button 10 stores onto the HDD 56 the image in the window 111 of the image pickup application program, the storage being made in a suitable format.

Releasing the half-pushed shutter button 10 causes the image pickup application program to set free the image from its motionless state in the window 111.

Figure 11:
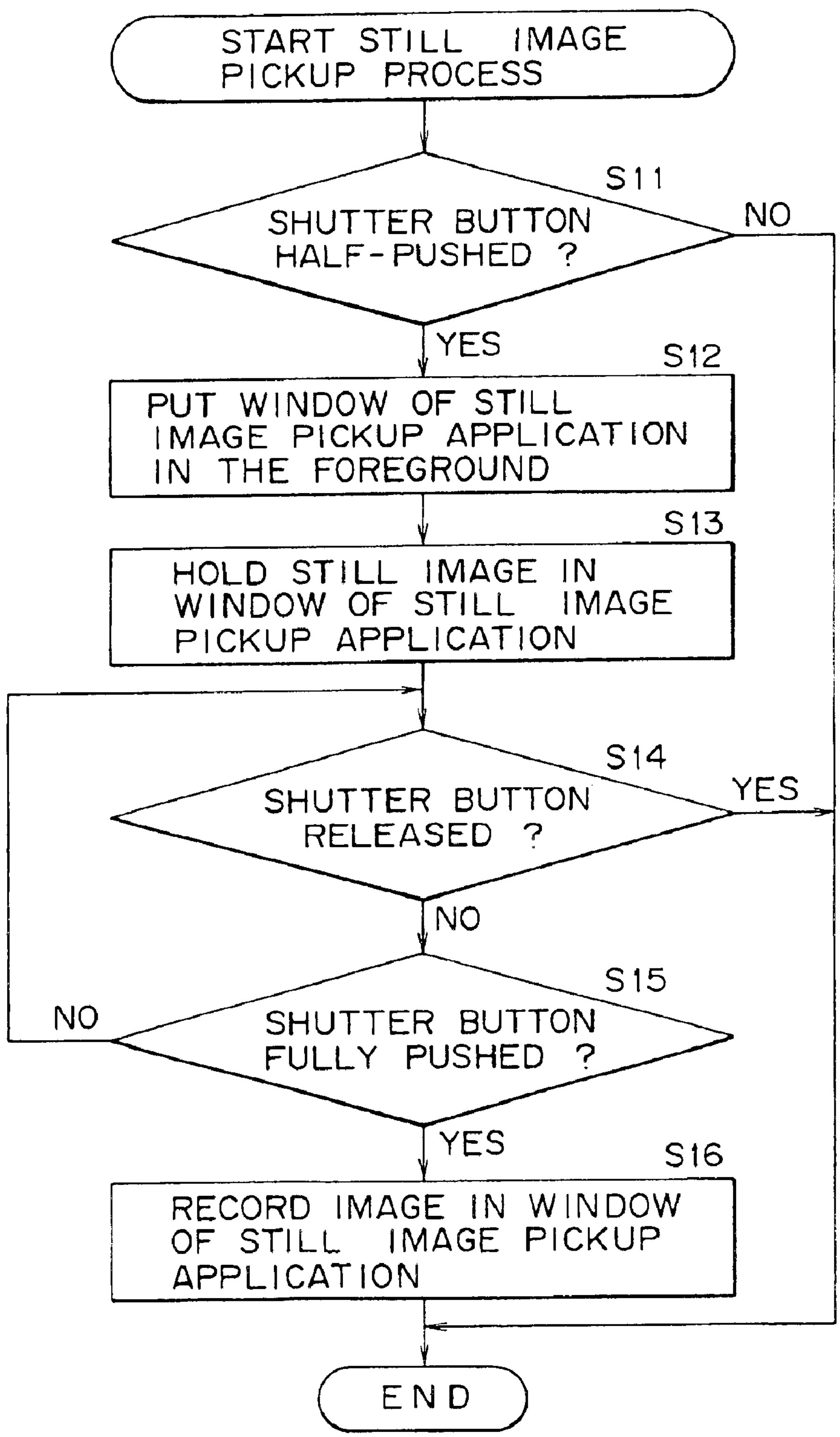
FIG. 11 is a flowchart of steps constituting a process of picking up a still image.

FIG. 11 is a flowchart of steps constituting a process of picking up a still image. In step S11, the CPU 52 checks to see if the shutter button 10 is half-pushed on the basis of the input from the half-push switch 85. If the shutter button 10 is judged to be half-pushed, step S12 is reached. In step S12, the CPU 52 activates a window of a still image pickup application program, causing the window to appear in front of the windows of all other applicable programs. In step S13, the CPU 52 holds still the image (captured through the CCD video camera 23) displayed in the window of the still image pickup application program.

In step S14, the CPU 52 checks to see if the shutter button 10 is released on the basis of the input from the half-push switch 85. If the shutter button 10 is not judged to be released, step S15 is reached. In step S15, the CPU 52 checks to see if the shutter button 10 is fully pushed on the basis of the input from the full-push switch 86. If the shutter button 10 is judged to be fully pushed, step S16 is reached. In step S16, the image in the window of the still image pickup application program is stored onto the HDD 56 in an appropriate format. This terminates the process of still image pickup.

If the shutter button 10 is not judged to be fully pushed in step S15, step S14 is reached again. The operative state of the shutter button 10 is then continuously monitored for judgment.

If the shutter button 10 is not judged to be half-pushed in step S11 or if the shutter button 10 is judged to be released in step S14, then the still image pickup process is terminated.

As described above, the user is able to pick up a still image of the object by operating the shutter button 10 alone.

Figure 12:
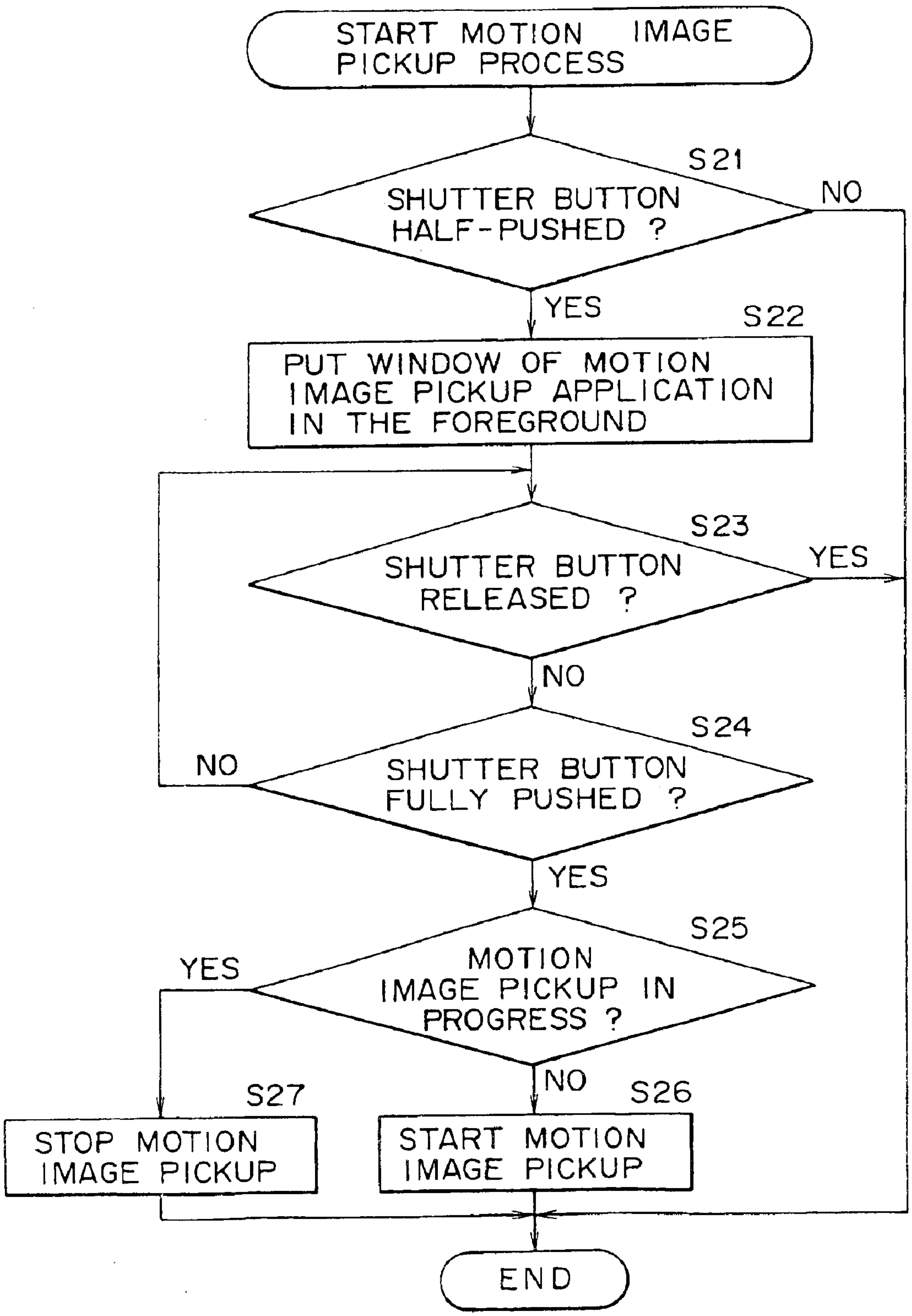
FIG. 12 is a flowchart of steps constituting a process of picking up a motion image.

A process of picking up a motion image will now be described. FIG. 12 is a flowchart of steps constituting the motion image pickup process. In step S21, the CPU 52 checks to see if the shutter button 10 is half-pushed on the basis of the input from the half-push switch 85. If the shutter button 10 is judged to be half-pushed, step S22 is reached. In step S22, a window of a motion image pickup application program is activated and made to appear in front of the windows of all other application programs.

In step S23, the CPU 52 checks to see if the shutter button 10 is released on the basis of the input from the half-push switch 85. If the shutter button 10 is not judged to be released, step S24 is reached. In step S24, the CPU 52 checks to see if the shutter button 10 is fully pushed on the basis of the input from the full-push switch 86. If the shutter button 10 is judged to be fully pushed, step S25 is reached. In step S25, the CPU 52 checks to see if a motion image is being picked up. If it is judged that no motion image is being picked up in step S25, step S26 is reached. In step S26, a motion image starts to be picked up, and the process is terminated. If a motion image pickup is judged to be in progress in step S25, step S27 is reached in which the motion image pickup is stopped and the process is terminated.

If the shutter button 10 is not judged to be fully pushed in step S24, step S23 is reached again. The operative state of the shutter button 10 is then continuously monitored for judgment.

If the shutter button 10 is not judged to be half-pushed in step S21 or if the shutter button 10 is judged to be released in steps S23, then the motion image pickup process is terminated.

As described, the user is able to carry out or stop the motion image pickup by operating the shutter button 10 alone.

Because the shutter button 10 alone needs to be operated for picking up still and motion images, the user will not likely miss a perfect moment for a good picture.

In the description above, the still image pickup application program or the motion image pickup application program was assumed to be already running. Alternatively, any one of these programs may be booted and executed the moment the shutter button 10 is half-pushed.

Computer programs designed to perform the above-described processes may be retained on such storage media as magnetic disks, CD-ROMs, or solid state memories when offered to users. The programs may also be distributed by use of such communication media as networks and satellites.

Through the use of the inventive information processing apparatus, information processing method and storage medium, the image pickup application program is activated when an image of an object is picked up and the user's suitable operations are detected. Only the shutter button needs to be operated for picking up still and motion images.

As many apparently different embodiments of this invention may be made without departing from the spirit and scope thereof, it is to be understood that the invention is not limited to the specific embodiments thereof except as defined in the appended claims.

What is claimed is:

1. An information processing apparatus including a CPU, a display unit, a general purpose data input section, and a graphic user interface for displaying windows on said display unit, the apparatus further comprising;

an operation member for activating a first image capture application program from a plurality of application programs when said operation member is operated to be in a first position, wherein at least one of the plurality of application programs is not related to image processing;

an imaging unit for capturing an image of an object in response to operation of said operation member, wherein the image is captured by said imaging unit when said operation member is operated to be in said first position and a window is displayed on said display unit by means of said graphic user interface showing an image related to the captured image, and wherein said window is displayed on said display unit in front of any other window related to another application program for as long as said operation member is in said first position; and a recording unit for recording the captured image if said operation member is moved from said first position to a second position.

2. The information processing apparatus according to claim 1, wherein a still image is captured by said imaging unit to be displayed if said first application program relates to capturing still images.

3. The information processing apparatus according to claim 1, wherein if said first application program for capturing said image is not active the time said operation member is operated to be in said first position, and first application program is booted in response to said that operation.

4. The information processing apparatus according to claim 1, wherein said recording unit begins recording a motion image captured by said imaging unit in response to said operation member being operated to be in said second position a first time and stops said recording in response to said operation member being operated to be in said second position a second time.

5. An information processing method for use with a CPU, a display unit, a general purpose data input section, and a graphic user interface for displaying windows on said display unit, the method comprising:

activating a first image capture application program from a plurality of application programs by the operation of an operation member to be in a first position, wherein at least one of the plurality of application programs is not related to image processing;

capturing an image of an object in response to operation of said operation member, wherein the image is captured by an imaging unit when said operation member is operated to be in said first position and a window is displayed on said display unit by means of said graphic user interface showing an image related to the captured image, and wherein said window is displayed on said display unit in front of any other window related to another application program for as long as said operation member is in said first position; and recording the captured image if said operation member is moved from said first position to a second position.

6. The information processing method according to claim 5, wherein a still image is captured to be displayed if said first application program relates to capturing still images.

7. The information processing method according to claim 5, wherein if said first application program for capturing said image is not active the time said operation member is operated to be in said first position, said first application program is booted in response to that operation.

8. The information processing method according to claim 5, wherein a motion image captured by said imaging unit begins to be recorded in response to said operation member being operated to be in said position a first time and stops being recorded in response to said operation member being operated to be in said second position a second time.

9. A storage medium for storing a program in a manner readable by an information processing apparatus for use with a CPU, a display unit, a general purpose data input section, and a graphic user interface for displaying windows on said display unit, the program allowing said information processing apparatus to execute an information processing method comprising:

activating a first image capture application program from a plurality of application programs by the operation of an operation member to be in a first position, wherein at least one of the plurality of application programs is not related to image processing;

capturing an image of an object in response to operation of said operation member, wherein the image is captured by an imaging unit when said operation member is operated to be in said first position and a window is displayed on said display unit by means of said graphic user interface showing an image related to the captured image, and wherein said window is displayed on said display unit in front of any other window related to another application program for as long as said operation member is in said first position; and recording the captured image if said operation member is moved from said first position to a second position.

10. The storage medium according to claim 9, wherein a still image is captured to be displayed if said first application program relates to capturing still images.

11. The storage medium according to claim 9, wherein if said first application program for capturing said image is not active at the time said operation member is operated to be in said first position, said first application program is booted in response to that operation.

12. The storage medium according to claim 9, wherein a motion image captured by said imaging unit begins to be recorded in response to said operation member being operated to be in said second position a first time and stops being recorded in response to said operation member being operated to be in said second position a second time.

13. The information processing apparatus according to claim 1, wherein the window showing the image related to the captured image only partially covers at least one other window displayed in the display unit related to another application program.

* * * * *